Patented Sept. 1, 1936

2,052,743

UNITED STATES PATENT OFFICE 2,052,743

PROCESS OF DISTILLING TERPINEOL

Carlisle H. Bibb, Pensacola, Fla., assignor to Newport Industries, Inc., Pensacola, Fla., a corporation of Delaware No Drawing. Application December 4, 1935, Serial No. 52,808

5 Claims. (Cl. 260—153)

This invention relates to the production of a pure form of terpineol having an improved odor.

More specifically this invention relates to the distillation of crude terpineol in the presence of a caustic alkali to make possible a better separation of pure terpineol in high yield.

Crude terpineol is made commercially from pine oil, turpentine or an oil containing alpha terpineol by agitating the oil with dilute acid such as dilute sulphuric acid until the pinene or alpha terpineol is hydrated to form terpin hydrate crystals.

The oil adhering to the terpin hydrate crystals is removed by filtration or by steam distillation. The terpin hydrate crystals are then suspended in dilute acid solution and steam distilled to form an oil which distills over with the steam. This oil contains about 85% tertiary alcohols or terpineols, 14% of a hydrocarbon fraction, and about 1% of phenolic and acid compounds and represents the crude terpineol of commerce.

When the crude terpineol is distilled at atmospheric pressure or under vacuum to remove the lower boiling hydrocarbon fraction and to subsequently distill over the terpineols, it has been found that the terpineol fraction has a raw or harsh odor of a phenolic nature. Furthermore, some decomposition of the terpineols takes place due to the action of acidic compounds and heat on the tertiary alcohols present which are classed as terpineols. It is also impossible to completely free the distilled terpineols from the hydrocarbons since these hydrocarbons are slowly generated throughout the distillation process.

I have now discovered, however, that when a small amount of caustic alkali is added to the still during the distillation of the crude terpineol there is no decomposition of the terpineols to hydrocarbons and also the terpineol fraction which is separated has a highly improved odor similar to a very delicate lilac perfume.

It is therefore an object of this invention to prepare pure terpineols of improved odor.

Another object of this invention is to recover terpineols of improved purity from crude terpineol containing oil.

A further object of this invention is to distill pure terpineol from crude terpineol containing oil in the presence of an alkali which will react with a phenol.

A further object of this invention is to separate pure terpineol in high yield from crude terpineol containing oil by distilling said oil in the presence of a caustic alkali.

Other and further objects of this invention will be apparent from the following detailed description and appended claims.

The following example illustrates a preferred embodiment of the invention:

Example

A still is charged with 200 gallons of crude terpineol oil containing about 85% tertiary alcohols or terpineols, 14% of a hydrocarbon fraction and about 1% of phenolic and acid constituents. One gallon of 50% sodium hydroxide solution is added to the charge in the still. The still is then heated up to temperatures of about 86° C. at 6 mm. pressure to remove the hydrocarbon fraction from the oil. After the hydrocarbon fraction has been removed, the still is heated further, up to temperatures of about 94° C. at 6 mm. pressure, to distill off the pure terpineol fraction. A yield of about 80% pure terpineol is obtained.

While the above temperatures may vary somewhat depending upon the analysis of the crude terpineol oil, the temperatures listed indicate a preferred operation for an oil having the above described analysis. Obviously the temperatures indicated will also vary with a variation in the pressures used in the distilling apparatus.

Other caustic alkalies than sodium hydroxide can be used with good results. For example, any alkali which will react with a phenol can be used, such as sodium hydroxide, potassium hydroxide, or lithium hydroxide and the like.

The chemical reactions involved in the production of pure terpineols according to this invention are complicated since it could not be anticipated that the caustic alkali would hold back the phenolic compounds and other acidic materials during distillation because the alkali compounds of such substances have a tendency to decompose upon distillation due to their weak acid character.

The amounts of caustic alkali used may vary within a wide limit since considerably less amounts than indicated in the above example are operative and excessive amounts over the amount indicated are not inoperative.

I have also found that substantially the same results may be obtained by washing the crude terpineol oil with the alkali before distillation. However, this washing step can be avoided by merely charging the alkali into the still.

From the above description, it should be understood that I have prepared pure terpineol of improved odor and free from phenolic and acid compounds. I have also prevented the decomposition of the terpineols into hydrocarbons, such as terpenes, during the refining operation and am therefore able to obtain a higher yield of pure terpineols from crude terpineol containing oil than was heretofore considered possible.

I am aware that many changes may be made and numerous details of the process may be varied through a wide range without departing from the principles of this invention and I, therefore, do not purpose limiting the patent granted hereon otherwise than necessitated by the prior art.

I claim as follows:

1. The process of producing pure terpineol which comprises distilling a crude terpineol containing oil in the presence of an alkali which will react with a phenol and recovering the terpineol fraction.

2. The process of producing refined terpineol which comprises distilling crude terpineol containing oils in the presence of a caustic alkali and recovering the terpineol fraction.

3. The process of producing terpineol substantially free from phenolic bodies which comprises distilling crude terpineol in the presence of sodium hydroxide and recovering the terpineol fraction.

4. The process of producing terpineol substantially free from terpene hydrocarbons which comprises distilling crude terpineol containing oil in the presence of small amounts of caustic alkali and recovering the terpineol fraction.

5. The process of producing pure terpineols in high yield from a crude terpineol oil containing about 85% tertiary alcohols, 14% of a hydrocarbon fraction and about 1% of phenolic and acid constituents which comprises heating said oil in the presence of caustic alkali to temperatures of about 86° C. at 6 mm. pressure to remove the hydrocarbon fraction therefrom, further heating the oil to temperatures of about 94° C. at 6 mm. pressure to remove the pure terpineol fraction and recovering said fraction.

CARLISLE H. BIBB.